United States Patent
Afantenos et al.

(10) Patent No.: US 12,164,903 B2
(45) Date of Patent: Dec. 10, 2024

(54) DEVICES AND METHOD FOR MANAGING ELECTRONIC CONTROL UNITS OF A MOTOR VEHICLE

(71) Applicant: Renault s.a.s., Boulogne-Billancourt (FR)

(72) Inventors: Marie-Cecile Afantenos, Labarthe sur leze (FR); Patrick Benavoli, Toulouse (FR); Pascal Menier, St Gaudens (FR)

(73) Assignee: Ampere S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/995,284

(22) PCT Filed: Mar. 18, 2021

(86) PCT No.: PCT/EP2021/056975
§ 371 (c)(1),
(2) Date: Sep. 30, 2022

(87) PCT Pub. No.: WO2021/197864
PCT Pub. Date: Oct. 7, 2021

(65) Prior Publication Data
US 2023/0153097 A1    May 18, 2023

(30) Foreign Application Priority Data
Mar. 30, 2020    (FR) ........................ 2003114

(51) Int. Cl.
*G06F 8/65* (2018.01)
*B60W 50/00* (2006.01)
*B60W 50/02* (2012.01)

(52) U.S. Cl.
CPC .............. *G06F 8/65* (2013.01); *B60W 50/02* (2013.01); *B60W 2050/0063* (2013.01); *B60W 2050/0075* (2013.01)

(58) Field of Classification Search
CPC . G06F 8/65; B60W 50/02; B60W 2005/0063; B60W 2050/0075
(Continued)

(56) References Cited

U.S. PATENT DOCUMENTS 7,360,208 B2 *   4/2008   Joshi ....................... H04L 67/34
                                                         714/E11.207
7,366,589 B2 *   4/2008   Habermas ................. G06F 8/65
                                                                701/1

(Continued)

OTHER PUBLICATIONS

Onuma et al, "A Method of ECU Software Updating", IEEE, pp. 298-303 (Year: 2018).*

(Continued)

*Primary Examiner* — Anil Khatri
(74) *Attorney, Agent, or Firm* — Oblon, McClelland, Maier & Neustadt, L.L.P.

(57) ABSTRACT

A device for managing an electronic control unit of a motor vehicle that includes an update module that updates the configuration of the electronic control unit. The update module has a first programmable update interface that updates the parameter value associated with at least one configuration parameter and updates the filter value associated with the at least one configuration parameter in response to the update. The update module has a second programmable update interface to update the parameter values associated with at least part of a set of configuration parameters on the basis of the filter values associated with the configuration parameters.

9 Claims, 5 Drawing Sheets

(58) Field of Classification Search
USPC .................................................. 717/168–174
See application file for complete search history.

(56) References Cited

U.S. PATENT DOCUMENTS

| | | | | |
|---|---|---|---|---|
| 7,584,470 | B2* | 9/2009 | Barker | G06F 8/61 |
| | | | | 717/172 |
| 8,229,624 | B2* | 7/2012 | Breed | B60R 21/0132 |
| | | | | 701/36 |
| 8,397,228 | B2* | 3/2013 | Matlin | G06F 8/65 |
| | | | | 717/173 |
| 8,561,954 | B2* | 10/2013 | Padilla | E06C 7/14 |
| | | | | 248/238 |
| 9,323,546 | B2* | 4/2016 | Rork | G06F 8/65 |
| 9,886,261 | B1* | 2/2018 | Hotchkies | H04L 67/34 |
| 10,466,717 | B1* | 11/2019 | Su | H04W 4/44 |
| 11,157,262 | B2* | 10/2021 | Aiba | G06F 8/65 |
| 11,740,885 | B1* | 8/2023 | Fields | B60K 35/00 |
| | | | | 717/172 |
| 11,755,314 | B2* | 9/2023 | Brugman | G06F 8/658 |
| | | | | 717/168 |
| 12,001,825 | B2* | 6/2024 | Sangameswaran | G06F 8/656 |
| 2003/0163664 | A1 | 8/2003 | Kanda | |
| 2014/0310702 | A1* | 10/2014 | Ricci | B60R 25/102 |
| | | | | 717/173 |
| 2015/0217780 | A1 | 8/2015 | Chen et al. | |
| 2016/0355193 | A1 | 12/2016 | Chen et al. | |
| 2019/0391800 | A1* | 12/2019 | Lin | G06F 8/65 |

OTHER PUBLICATIONS

Guissouma et al, "Virtual Test Environment for Efficient Verification of Software Updates for Variant-Rich Automotive Systems", IEEE, pp. 1-8 (Year: 2019).*
Sarwar et al, "Network of ECUs Software Update in Future vehicles", IEEE, pp. 1-5 (Year: 2019).*
Herberth et al, "Automated Scheduling for Optimal Parallelization to Reduce the Duration of Vehicle Software Updates", IEEE, pp. 2921-2933 (Year: 2019).*
Suzuki et al, "Data Compression for Software Updating of ECUs", IEEE, pp. 304-307 (Year: 2019).*
Plappert et al, "Secure and Lightweight ECU Attestations for Resilient Over-the-Air Updates in Connected Vehicles", ACM, pp. 283-297 (Year: 2023).*
International Search Report Issued Apr. 15, 2021, in PCT/EP2021/056975, filed on Mar. 18, 2021, 2 pages.
Preliminary French Search Report dated Feb. 9, 2021, in French Application No. 2003114 filed on Mar. 30, 2020.

* cited by examiner

DEVICES AND METHOD FOR MANAGING ELECTRONIC CONTROL UNITS OF A MOTOR VEHICLE

TECHNICAL FIELD

The invention generally relates to on-board automotive electronics and in particular to a device and method for controlling electronic control units of motor vehicles.

PRIOR ART

Modern vehicles use many electronic control units (ECUs) to control the operation of components such as engines, drivetrains, transmissions, brakes, suspension, in-vehicle infotainment systems, communication systems, body systems, chassis systems, etc.

An electronic control unit is an on-board computer or on-board system configured to electronically control a function or a physical device of vehicles. Each ECU sends control signals to the corresponding device to control it and stores data relating to the device that it controls. The data stored in ECUs especially allow the cause of malfunctions of the vehicle to be diagnosed.

The diagnosis of electronic control units is generally performed by a diagnostic tool (also called a 'tester') that is connected to electronic control units via a wired or wireless connection, through which the electronic control units and the diagnostic tool exchange data.

Electronic control units are initialized by the motor-vehicle manufacturer during manufacture in the factory. Once an electronic control unit has been initially programmed in a vehicle, it may prove necessary to modify or change certain portions of the initial program code, for example in order to change configuration-parameter values, to add data, to make corrections to application files, etc. Thus, diagnostic systems have been developed so that product-development teams, software/hardware testing teams and after-sales teams can detect and repair defects or improve the settings of a vehicle by connecting their diagnostic tools to electronic control units.

The configuration data thus stored in the memories of the electronic control units may be updated during the life-cycle of the vehicle.

The (wireless or wired) communication between a (remote or on-board) diagnostic tool and an electronic control unit is set up using an automotive protocol that allows errors to be diagnosed and electronic control units to be reprogrammed.

The protocol UDS (acronym of Unified Diagnostic Services) is an international unified automotive diagnostic services protocol. It allows, via a diagnostic server, various electronic control units to be interrogated with a view to making the latter upload information on malfunctions or on particular events that have taken place during the operation of the vehicle.

Electronic control units may be updated by the motor-vehicle manufacturer or by a technical coordinator, either remotely via a remote diagnostic server or via an on-board diagnostic server using a diagnostics port.

Techniques for managing and controlling updates of electronic control units of a motor vehicle already exist.

A first technique for automatically updating electronic control units of a motor vehicle is described in U.S. Pat. No. 10,416,989 B2. This technique allows, over-the-air or via an on-board diagnostic server, software updates to be delivered to an on-board computer of a motor vehicle. Firstly, the need to perform software updates on an on-board computer is identified. Next, to the on-board computers requiring a software update, a configuration file is sent from a (remote or on-board) server with a view to performing the required updates. The update parameters are contained in temporary files that are stored beforehand in the memory of the on-board computer, then executed and lastly deleted after the reprogramming.

A second technique for reprogramming electronic control units of a motor vehicle has been disclosed in US patent application No. US20140058532 A1. This second technique allows an electronic control unit to be programmed and configured using a partial flashing method, making it possible to divide the memory of the electronic control unit into a plurality of compartments depending on the existing types of digital files and to reconfigure only the compartments that must be reprogrammed. The reprogramming method according to patent application No. US 20140058532 A1 makes it possible, initially, to define a memory in the electronic control unit that stores various types of content files each including lines of code. Next, it allows the memory to be segmented by dividing it into various sections, each section being characterized by the nature of the files that it contains (application code, the code of the operating system, files, calibration etc.) and potentially comprising empty memory spaces to which it is possible to write the additional code. Thus, if it is envisioned to reprogram one type of file in particular, the memory section characterized by the same type of file is considered and the empty space of this section is used to do the reprogramming, the rest of the content files of the memory remaining unaffected.

A third technique for remotely updating electronic control units arranged in a vehicle is described in No. U.S. Pat. No. 10,101,992 B2. This technique allows automotive microcontrollers to be reprogrammed using a wireless over-the-air communication network and allows various types of computers to be distinguished between. The wireless communication with a remote network makes it possible to ensure the exchange of data between the automotive microcontrollers and the server, in order to obtain a set of differential updates. All of the update packets are stored in a storage memory in the telematic unit. The update data are then managed by the processor of the telematic unit, then conveyed, via the network of controllers of the vehicle, to a target electronic control unit where they will subsequently be installed.

Existing techniques for updating electronic control units allow electronic control units to be reprogrammed both by the motor-vehicle manufacturer and by technological coordinators.

For strategic, architecture-related or contractual reasons, electronic-control-unit updates effected by technical coordinators are not always communicated to the motor-vehicle manufacturer.

For example, the technical coordinator may perform an update of the configuration data of an electronic control unit and not communicate such to the motor-vehicle manufacturer as it does not want to change the list of criteria in its world vehicle database because this list is considered to form an integral part of the identity of the vehicle.

The technical coordinator may furthermore not communicate to the motor-vehicle manufacturer an update of an option to consolidate the state of the option in the vehicle but not in the server of the motor-vehicle manufacturer.

The technical coordinator may also be contractually obliged to guarantee the availability of the option once the vehicle has left the garage and may not permit it to set up a reliable connection and communication with the servers of the manufacturer.

With existing techniques, if configuration data are updated by the motor-vehicle manufacturer after one or more updates by the technical coordinator, the data updated by the technical coordinator are lost. Existing techniques do not allow a distinction to be made between electronic-control-unit parameterization carried out in response to an update command received from the motor-vehicle manufacturer and parameterization carried out in response to an update command received from a third party (for example a technical coordinator).

There is therefore a need to protect parameters modified in response to an update command transmitted by the technical coordinator from alteration during an update carried out at the behest of the motor-vehicle manufacturer, without the need for deployment of new infrastructure or other tools.

General Definition of the Invention

The invention improves the situation. To this end, the invention provides a device for controlling an electronic control unit of a motor vehicle, comprising a module for updating the configuration of the electronic control unit, said configuration being defined by a set of configuration parameters, at least one configuration parameter being associated with a parameter value and with a filter value, the updating module comprising:
  a first programmable update interface, the first update interface being configured to update the parameter value associated with at least one configuration parameter in response to an update command received from a first source and to update the filter value associated with said at least one configuration parameter in response to the update of said value;
  a second programmable update interface, the second update interface being configured to update the parameter values associated with at least some of the set of configuration parameters depending on the filter values associated with said configuration parameters, in response to an update command received from a second source.

According to certain embodiments, the parameter values associated with the set of configuration parameters may be initialized at initial factory values and/or result from a preceding update.

According to certain embodiments, the second update interface may be configured to update, in response to an update command received from the second source, the set of configuration parameters defining the configuration.

According to certain embodiments, the first update interface may be configured to read the filter value associated with one or more configuration parameters.

According to certain embodiments, the first update interface may be configured to modify the filter value associated with one or more configuration parameters to convert one or more automatic or manual parameters into one or more manual or automatic parameters, an automatic parameter being a configuration parameter associated with a parameter value updated in response to an update command received from the second source, a manual parameter being a configuration parameter associated with a parameter value updated in response to an update command received from said first source.

According to certain embodiments, the second update interface may be configured to remove the filter value associated with a given configuration parameter.

According to certain embodiments, the first source may be a diagnostic tool accessible by the motor-vehicle manufacturer with a view to initializing the parameter values associated with the set of configuration parameters, the diagnostic tool being accessible by a technical coordinator with a view to updating the value associated with at least one configuration parameter and to updating the filter value associated with said at least one configuration parameter in response to the update through the first update interface.

According to certain embodiments, the second source may be a remote updating server accessible by the motor-vehicle manufacturer with a view to updating at least some of the set of configuration parameters.

The invention further provides a method for controlling an electronic control unit of a motor vehicle, comprising updating the configuration of the electronic control unit, the configuration being defined by a set of configuration parameters, at least one configuration parameter being associated with a parameter value and with a filter value, the method comprising steps of:
  initializing the parameter values associated with the set of configuration parameters to initial factory values;
  updating, through a first programmable update interface, the parameter value associated with at least one configuration parameter in response to an update command received from a first source;
  updating, through the first programmable update interface, the filter value associated with said at least one configuration parameter in response to the update of said parameter value associated with at least one configuration parameter;
  updating the parameter values associated with at least some of the set of configuration parameters depending on the filter values associated with said configuration parameters, in response to an update command received from a second source.

Advantageously, the embodiments of the invention offer a mechanism for protecting parameters modified in response to a command to update at the behest of the technical coordinator against alteration during an update performed in response to a command to update at the behest of the motor-vehicle manufacturer.

Advantageously, the embodiments of the invention allow parameterization of the configuration of electronic control units, performed at the behest of the motor-vehicle manufacturer, to be distinguished from parameterization performed at the behest of the technical coordinator.

Advantageously, the embodiments of the invention offer means for protecting the personalized configuration performed by the technical coordinator before a software update performed by the motor-vehicle manufacturer.

Advantageously, the embodiments of the invention offer two dedicated programmable update interfaces, a first update interface being accessible by the technical coordinator and a second programmable update interface being dedicated to the motor-vehicle manufacturer. These two programmable update interfaces offer a programmable protecting means allowing a prior configuration version installed by the technical coordinator to be protected.

Advantageously, the embodiments of the invention allow, through the first programmable update interface accessible by the technical coordinator, the state of the configuration shield to be read, a reference to at least one given configuration parameter to be added, a reference to at least one given configuration and reference to parameter to be deleted, configuration parameters to be deleted.

Advantageously, the of the embodiments invention provide for programmable protection of data via the diagnostic interface.

BRIEF DESCRIPTION OF THE DRAWINGS

Other features, details and advantages of the invention will become apparent on reading the description given with reference to the appended drawings, which are given by way of example and which respectively show.

DETAILED DESCRIPTION

Figure 1:
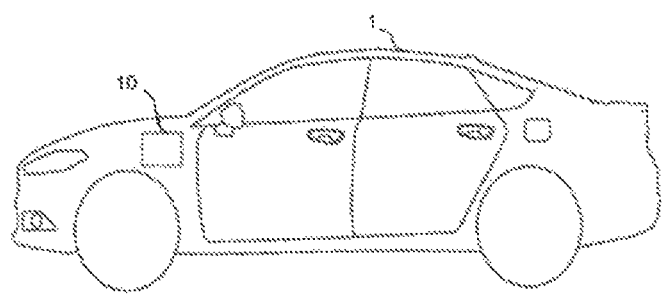
FIG. 1 is a schematic view illustrating a motor vehicle equipped with an electronic control unit.

The embodiments of the invention provide a device and method for controlling an electronic control unit of a motor vehicle. The device and method according to the invention offer protection of configuration data of an electronic control unit against alteration during an update performed by the motor-vehicle manufacturer following an update effected by the technical coordinator. The protection of the data according to the invention is based on the implementation of configuration shield implemented through two dedicated programmable update interfaces.

Such as used here, a motor-vehicle manufacturer refers to the manufacturer of the motor vehicle an electronic control unit of which is controlled by the device and method according to the invention.

Such as used here, a technical coordinator refers to a third party different from the motor-vehicle manufacturer and able to perform maintenance on and manage malfunctions of electronic control units, and also able to install updates on electronic control units of a motor vehicle. By way of non-limiting example, a technical coordinator may be a component manufacturer (for example a developer of electronic control units or a manufacturer the products of which use electronic control units) able to install software updates for the electronic control units produced or supported by this component manufacturer. In another example, the technical coordinator may be a service provider (for example a dealer, a mechanic, an engineer, or a service center) able to update the electronic control units installed in the motor vehicles supported by the service provider.

Such as used here, a first update interface is accessible by a first source such as the technical coordinators, and a second update interface is accessible by a second source, such as the motor vehicle manufacturer.

Such as used here, automatic parameterization designates parameterization of the configuration of an electronic control unit that is effected by the motor-vehicle manufacturer.

Such as used here, manual parameterization designates parameterization of the configuration of an electronic control unit that is effected by a technical coordinator.

Such as used here, a configuration parameter that is 'automatic' or said to be 'in automatic state' designates a configuration parameter the parameter value of which was updated in response to a command transmitted by the motor-vehicle manufacturer (for example in response to an initialization command transmitted in the initialization phase during manufacture in the factory or in response to an update command transmitted during the life-cycle of the vehicle in after-sales service).

Such as used here, a configuration parameter that is 'manual' or said to be 'in manual state' designates a configuration parameter the parameter value of which was updated in response to an update command transmitted by the technical coordinator.

Such as used here, a parameter conversion operation designates a command transmitted by the motor-vehicle manufacturer or by a technical coordinator with a view to changing the manual or automatic character of a configuration parameter.

Such as used here, a parameter shield (also called 'reference' or 'parameter filter') designates a software filter representing a numerical value stored in the electronic control unit and used to protect a manual parameter during an update of the configuration of the electronic control unit, effected at the behest of the motor-vehicle manufacturer. The parameter shield therefore designates a software filter used to protect said parameter during the update of said parameter value in response to an update command received from a second source. The configuration shield therefore comprises the configuration parameters that are here called 'manual', which will be protected from subsequent updates in response to an update command received from a second source. The filter does not require the dimension n of the parameter and thus any variations therein are immaterial. There is therefore no need to know in advance the configuration parameters that will be concerned or their memory address.

Such as used here, the addition of a parameter shield consists in adding to the configuration shield a reference to a given configuration parameter.

Such as used here, the removal of a parameter shield consists in removing from the configuration shield a reference to a given configuration parameter.

Such as used here, a configuration shield designates a set of parameter filters representing digital values stored in the electronic control unit and used by the electronic control unit to protect the manual parameters during an update of the configuration of the electronic control unit, effected at the behest of the motor-vehicle manufacturer. The configuration shield may pertain to some or all of the configuration parameters of the electronic control unit. The configuration shield contains a reference to each manual parameter. The configuration shield may be constructed incrementally during the life-cycle of the vehicle through local updates of the configuration parameters, allowing parameter shields to be added or removed individually following an update effected by the technical coordinator. The configuration shield is a protecting mechanism that allows the configuration parameters to be protected against a subsequent alteration following an update effected by the motor-vehicle manufacturer.

Such as illustrated here, an over-the-air communication designates a wireless communication between an electronic control unit and one or more remote servers accessible by the motor-vehicle manufacturer and under its responsibility.

FIG. 1 shows a motor vehicle 1 comprising various functional components (not shown) implementation and/or control of which depend(s) on various electronic control units integrated into the vehicle 1. For the sake of clarity, a single electronic control unit 10 has been shown in FIG. 1.

According to certain embodiments, the electronic control unit 10 may be configured to control the operation of a component in the vehicle 1.

According to certain embodiments, a component may be chosen from a group especially comprising an engine, a drivetrain, transmissions, brakes, the suspension, in-vehicle infotainment systems, communication systems, body systems, chassis systems, the power-steering system, the accelerating system, the system for locking the doors, electronic fuel-injection systems, and the anti-lock braking system.

According to certain embodiments, the electronic control unit 10 may be configured to collect and analyze driving data that may be provided to an insurance company or used to improve the driving experience or to provide advanced or automated driver assistance.

According to certain embodiments, the electronic control unit 10 may be configured to detect anomalies in itself and in the component that it controls and to store the component operation anomaly data in a storage unit (not illustrated in FIG. 1).

According to certain embodiments, the electronic control unit 10 may be configured with software instructions to detect faults and predict stopping times, to allow integrated rollback to preceding versions of the software of the electronic control unit, and updates of diagnostic services, among other operations.

According to certain embodiments, the electronic control unit 10 may be chosen from a group comprising the unit controlling the in-vehicle infotainment, the unit ensuring around view monitoring, the engine control unit, or the hybrid or electrical vehicle controller.

The electronic control unit 10 may be configured to store data relative to configuration parameters that for example allow the human-machine interface of the vehicle to be personalized depending on its model, the country for which it is intended, its color, and other options such as whether a reversing camera has been added.

According to certain embodiments, a configuration parameter may be chosen from a group for example containing a parameter of the tow-hitch configuration, a parameter of the configuration of the CD changer, a parameter of the configuration of the rear camera, a parameter of the configuration of the after-sales alarm, a parameter of the configuration of the color of the vehicle, a parameter of the configuration of the engine speed, a parameter of the configuration of the use of a pump not originally furnished with the vehicle but compatible therewith, and a parameter of the configuration of the speed limiter for a fleet of vehicles.

Figure 2:
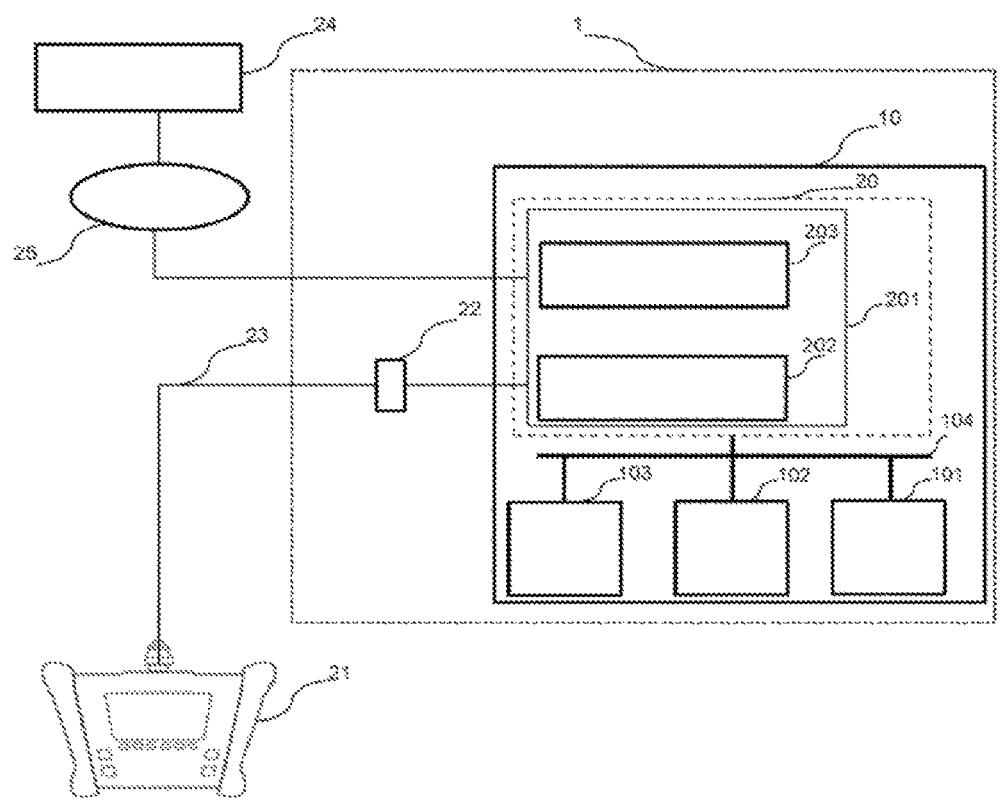
FIG. 2 is a schematic showing an example of a block structure of a device for controlling an electronic control unit, according to certain embodiments of the invention.

With reference to FIG. 2, the embodiments of the invention provide a device 20 for controlling an electronic control unit 10 of a motor vehicle 1, the device 20 comprising an updating module 201 configured to update the configuration of the electronic control unit 10, the configuration of the electronic control unit 10 especially being defined by a set of configuration parameters, at least one configuration parameter being associated with a parameter value, a configuration-parameter size in number of bits, and a filter value.

According to certain embodiments, the electronic control unit 10 may comprise a storage unit 101 configured to store configuration data of the electronic control unit 10, these comprising the parameter values and the filter values associated with the manual configuration parameters.

According to certain embodiments, the storage unit 101 may comprise one or more read-only memories and/one or more random-access memories.

According to certain embodiments, the electronic control unit 10 may further comprise a processor 102, a communication controller (not illustrated in FIG. 2), and an input-output interface 103. The processor 102 may be configured to perform the computations based on control programs stored in the read-only memory. The random-access memory may be configured to temporarily store resultant data computed by the processor. The processor 102, the storage unit 101, and a communication controller may be connected to one another and to the input-output interface by a bidirectional bus 104.

According to certain embodiments, the input-output interface 103 may be connected to one or more sensors, the data delivered by the sensors possibly being saved in the storage unit 101.

The updating module 201 according to the invention allows updates of configuration parameters to be protected against alteration during the cycle of operation of the vehicle 1. The protection of the configuration data according to the invention is based on implementation of two electronic-control-unit update interfaces that are programmable, these comprising a first update interface accessible by technical coordinators and a second update interface accessible by the motor-vehicle manufacturer, the interface thus allowing the source of the update to be identified. More precisely, with reference to FIG. 2, the update module 201 may comprise a first programmable update interface 202 configured to update the parameter value associated with at least one configuration parameter in response to an update command received from a first source 21 and to update the configuration shield by adding thereto a reference to said at least one configuration parameter in response to the update of the parameter value, the addition of a reference to the configuration parameter allowing the filter value associated with said parameter to be updated.

According to certain embodiments, the first source 21 may be an on-board diagnostic tool that communicates with the electronic control unit 20 via a wired connection 23 that may use a centralized diagnostics port 22 of the vehicle 1 allowing the various electronic control units of the vehicle 1 to be accessed.

According to certain embodiments, the diagnostics port 22 may be configured to electronically connect to the electronic control unit 10, for example via a communication medium such as a bidirectional serial K-line or via a bidirectional serial network such as a CAN network (CAN being the acronym of Controller Area Network).

According to certain embodiments, the first source 21 may be configured to communicate with the electronic control unit 10 via an electronic-control-unit network or via a gateway electronic control unit.

According to certain embodiments, the first source 21 may be accessible by a technical coordinator with a view to updating the value associated with at least one configuration parameter and to updating the filter value associated with said at least one configuration parameter in response to said update through the first update interface 202.

To distinguish the parameterization carried out by the motor-vehicle manufacturer from the parameterization effected by a technical coordinator, the updating module 201 may further comprise a second programmable update interface 203 configured to update the parameter values associated with at least some of the set of configuration parameters depending on the filter values associated with the configuration parameters in response to an update command received from a second source 24, the updated parameter values possibly resulting from an initializing step effected in the factory and/or resulting from a preceding updating step effected by a technical coordinator and/or by the motor-vehicle manufacturer.

According to certain embodiments, the second source 24 may be a remote update server accessible by the motor-vehicle manufacturer with a view to updating at least some of the set of configuration parameters through the second update interface 203. The communication between the second source 24 and the electronic control unit 10 may for example be an over-the-air communication or a communication via a USB key, an over-the-air communication designating an electromagnetic communication employing a technology or technique of wireless communication via a wireless communication network 25 (for example a cellular network, an ad hoc mobile network such as a Bluetooth or Wi-Fi network, etc.).

According to certain embodiments, the first source 21 and the second source 24 may be configured to communicate with the electronic control unit 10 using the UDS diagnostic protocol. The UDS protocol offers a plurality of services comprising reading and writing data to the electronic control unit 10, reprogramming the electronic control unit 10, activating routines remotely, etc. The first source 21 and the second source 24 may thus be configured to contact the electronic control unit 10, which is installed in the vehicle 1 and has UDS services activated.

A UDS service uses layers of the OSI model (OSI being the acronym of Open Systems Interconnection). The data-transmitting capabilities of a UDS-protocol stack allow any type of information to be read from or written to the electronic control unit 10.

A UDS-protocol service is associated with a service identifier (SID) and with service parameters that are contained in the data of a message frame transmitted by the on-board diagnostic tool (or even the first source 21) or remote diagnostic tool (or even the second source 24). The messages defined in the UDS protocol may be sent to the electronic control unit 10, which provides the predetermined services.

The services of the UDS-protocol stack comprise a set of services relative to data transmission including, for example, the service 'read data by identifier', the service 'read memory by address', the service 'write data by identifier' and the service 'write memory by address'.

Data may thus be read from or written to the electronic control unit 10 (and more precisely from/to the storage unit 101) using a data identifier (DID) and periodic identifiers, and may be read from a specified address in the physical memory, or even written to the electronic control unit 10 (and more precisely to the storage unit 101) by identifier and by memory address. The data read from and written to the electronic control unit 10 may relate to static information such as the serial number of the electronic control unit 10, current sensor state, engine speed, configuration parameters, etc. In particular, the write service allows configuration parameters to be modified during an update at the behest of the motor-vehicle manufacturer or of the technical coordinator.

The configuration data may be initialized or set in the factory during the manufacture of the vehicle.

According to certain embodiments, the configuration data (and similarly the configuration parameters) may be initialized so as to associate the vehicle model chosen by the customer with various options proposed by the motor-vehicle manufacturer (for example engine size, speed limiter, cruise control, gearbox). The application code present within the first memory space may be common to all the vehicles of a given model or vary depending on various options subscribed to by the customer.

The electronic control unit 10 may be initialized in the factory when the vehicle is on the production line, once the vehicle has been assembled, or while the vehicle is in the process of being assembled.

According to certain embodiments, the parameter values associated with the set of configuration parameters may be initialized at initial factory values. In particular, the second source 24 may be a diagnostic tool (or updating tool) accessible in the factory (for example on the production line) by the motor-vehicle manufacturer with a view to initializing the parameter values associated with at least some of the set of configuration parameters through the second update interface 203.

On exiting the factory, each configuration parameter of the electronic control unit 220 may be considered to be automatic, the parameter value associated with each configuration parameter having been defined during the initialization in response to an initialization command transmitted by the motor-vehicle manufacturer. The parameter shield associated with each configuration parameter of the electronic control unit is empty (or even associated with an initial or default value) on exiting the factory.

According to embodiments of the invention, the updating module 201 may be configured to control subsequent updates of configuration parameters during the operation of the vehicle 1 in response to update commands transmitted by the motor-vehicle manufacturer and/or a technical coordinator, the update commands at the behest of the motor-vehicle manufacturer and of the technical coordinator possibly taking place in different contexts and to different ends.

According to certain embodiments of the invention, the configuration parameters defining the configuration of the electronic control unit 10 may be updated in a targeted manner in response to an update command transmitted by the technical coordinator, or in a global manner in response to an update command transmitted by the motor-vehicle manufacturer—the updated parameters then must become manual. In other words, the first update interface 202 may be configured to simultaneously update one or more parameters in response to an update command transmitted by the technical coordinator and received from the first source 21 accessible by the technical coordinator.

The second update interface 203 may be configured to update at least some of the set of configuration parameters defining the configuration of the electronic control unit 10 in response to an update command transmitted by the motor-vehicle manufacturer and received from the second source 24 accessible by the motor-vehicle manufacturer.

According to certain embodiments, the configuration of the electronic control unit 10 may be updated with a view to subscribing to an option, to unsubscribing from an option, or to correcting errors. In particular, the configuration of an electronic control unit 10 may be updated, at the behest of the motor-vehicle manufacturer, to the ends of correcting errors or improving settings. An error may for example be an error in a parameter setting, stack overflow, stack underflow, or a normal or expected difference in operation.

For example, an update of the configuration of the electronic control unit 10 at the behest of the technical coordinator may take place following a request by the owner of the vehicle to activate a new option such as for example a tow hitch, reversing camera or after-sales alarm, to repaint the vehicle a new color requiring parameters of the human-machine interface to be updated in order to preserve on the displays of the passenger compartment a representation of the vehicle that matches its new exterior appearance, etc.

According to certain embodiments, the first programmable update interface 202 may be configured to read the state of the configuration shield in response to a read command transmitted by the technical coordinator and received from the first source 21. In particular, the first programmable update interface 202 may be configured to read the filter value associated with one or more configuration parameters in response to a read command transmitted by the technical coordinator and received from the first interface 202. The first interface 202 thus allows parameter shields to be read locally or globally.

According to certain embodiments, the first update interface 202 may be configured to modify the filter value associated with one or more configuration parameters in response to an update command transmitted by the technical coordinator and received from the first source 21, this allowing one or more automatic or manual parameters to be converted into one or more manual or automatic parameters. More precisely, the modification of the filter value associated with an automatic parameter allows this parameter to be converted into a manual parameter (this amounting to carrying out an operation of addition to the parameter shield), and the modification of the filter value associated with a manual parameter allows this parameter to be converted into an automatic parameter (this amounting to carrying out an operation of removal of a parameter shield or even of removal of the filter value associated with the configuration parameter).

According to certain embodiments, the first update interface 202 may be used to restore the initial values associated with the configuration parameters, the initial values corresponding to the factory values initialized during the manufacture of the vehicle 1 by the motor-vehicle manufacturer.

According to certain embodiments in which an update of the electronic control unit 10 is carried out with a view to unsubscribing from an option, the parameter shield associated with the configuration parameter corresponding to the unsubscription from the option may be withdrawn and the value associated with the configuration parameter may be reset to a value drawn from the configuration dossier of the manufacturer, updated for potential latest corrections.

According to certain embodiments, the second update interface 203 may be configured to update, in response to an update command transmitted by the motor-vehicle manufacturer and received from the second source 24, only automatic parameters, i.e. configuration parameters that are not protected by a parameter shield. In other words, during an update of the configuration parameters at the behest of the motor-vehicle manufacturer, configuration parameters that are automatic may be updated with the values indicated by the motor-vehicle manufacturer in the update command received from the second source 24. In contrast, configuration parameters that are manual and that have been updated beforehand by a technical coordinator and that are therefore protected by the configuration shield will not be modified.

According to certain embodiments, the second update interface 203 may be configured to convert a manual parameter back into an automatic parameter by removing the parameter shield associated with the manual parameter in response to an update command received from the second source 24 and transmitted by the motor-vehicle manufacturer. Advantageously, removal of the parameter shield allows the motor-vehicle manufacturer to retake control of the update of the electronic control unit 10. The shield-removal capability offered to the motor-vehicle manufacturer through the second interface 203 may prove to be necessary in situations comprising correction of errors by the motor-vehicle manufacturer.

According to certain embodiments, the second update interface 24 may be configured to update, in response to a global update command transmitted by the motor-vehicle manufacturer and received by the second source 24, the set of configuration parameters while circumventing the parameter shields associated with the manual parameters of the set of configuration parameters. In other words, the second update interface 24 may allow the motor-vehicle manufacturer, through the second source 24, to modify the values associated with the set of configuration parameters irrespectively of whether they are manual or automatic, i.e. whether they are protected by a parameter shield or not. The ability to circumvent the configuration shield makes it possible to avoid running the risk of an error requiring vehicles to be recalled to the manufacturers.

Figure 3:
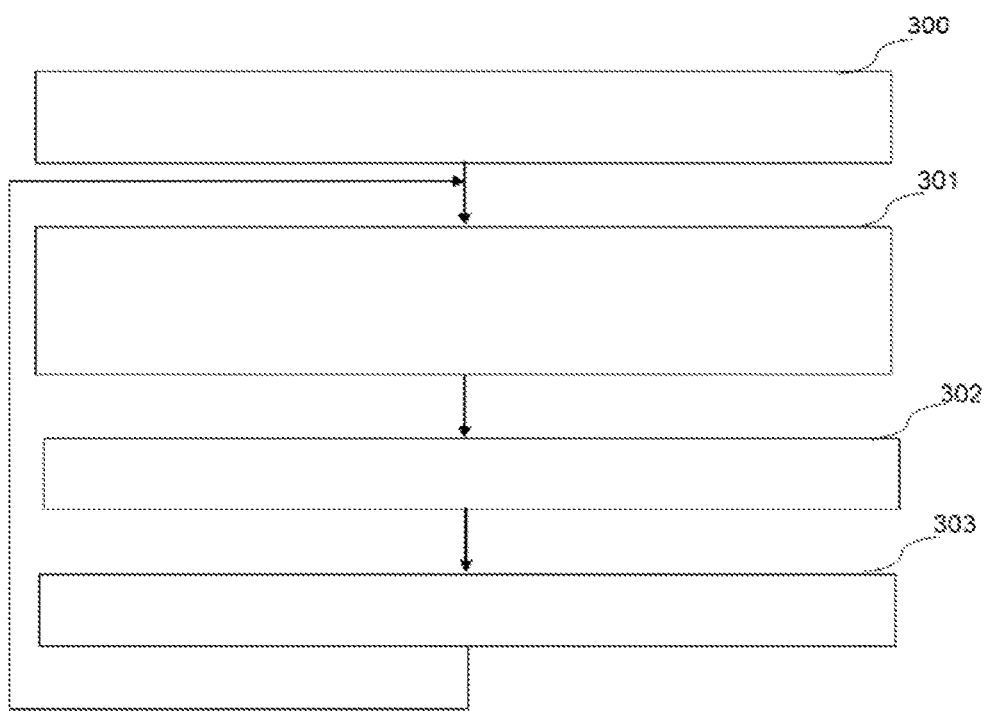
FIG. 3 is a flowchart showing a method for controlling an electronic control unit, according to certain embodiments of the invention.

With reference to FIG. 3, the embodiments of the invention further provide a method for controlling an electronic control unit 10 of a motor vehicle 1, the method comprising updating the configuration of the electronic control unit 10, the configuration being defined by a set of configuration parameters, at least one configuration parameter being associated with a parameter value and with a filter value.

Initializing step 300 may comprise initializing parameter values associated with the set of configuration parameters. The initializing step 300 may be carried out by the motor-vehicle manufacturer using the first source 21. In the initializing step, all the parameters are automatic and the parameter shields associated with the set of configuration parameters are initialized to values designating empty fields.

Step 301 of updating by the first source may comprise updating, through a first update interface, the at parameter value associated with least one configuration parameter in response to an update command received from the first source 21 and transmitted by a technical coordinator.

Step 302 of updating the filter may comprise updating, through the first update interface, the filter value associated with the at least one configuration parameter in response to the update of the parameter value associated with said at least one configuration parameter. During the update of the filter value associated with the configuration parameter the parameter value of which has been modified, this parameter is converted from an automatic parameter into a manual parameter and becomes protected by the parameter filter.

Step 303 of updating by the second source may comprise updating parameter values associated with at least some of the set of configuration parameters depending on the filter values associated with the set of configuration parameters, in response to an update command received from a second source 24 and transmitted by the motor-vehicle manufacturer. Step 303 may be followed by step 301, the values associated with the parameters updated in step 301 potentially resulting from the initializing step 300 or from the step 303 of updating by the second source.

According to certain embodiments, in step 303, the parameter values associated with the set of configuration parameters may be updated, in response to an update command transmitted by the motor-vehicle manufacturer and received from the second source 24, in such a way that only automatic parameters are updated. In other words, configuration parameters that are automatic may be updated in step 303 with the values indicated by the motor-vehicle manufacturer in the update command received from the second source 24. In contrast, configuration parameters that are manual and that have been updated beforehand by a technical coordinator and are therefore protected by the configuration shield may not be modified in step 303.

According to certain embodiments, in step 303, the parameter values associated with the set of configuration parameters may be updated, in response to an update command transmitted by the motor-vehicle manufacturer and received from the second source 24, in such a way that the parameter shields associated with manual parameters are removed in order to convert the manual parameters back into automatic parameters. The command to remove the shield may here relate to a sub-set of manual parameters.

According to certain embodiments, in step 303, the parameter values associated with the set of configuration parameters may be updated, in response to an update command transmitted by the motor-vehicle manufacturer and received from the second source 24, in such a way that the parameter shields associated with the manual parameters of the set of configuration parameters are circumvented, this allowing the parameter values associated with manual parameters to be updated in response to an update command transmitted by the motor-vehicle manufacturer and received from the second source 203. The shield circumvention may here relate to all of the manual parameters.

FIGS. 4 to 10 illustrate, via sequence diagrams and block structures, the steps of the method for controlling an electronic control unit 10 according to certain embodiments of the invention, in which the electronic control unit is the unit controlling infotainment in a motor vehicle, the configuration is defined by ten parameters denoted p1 to p10 comprising from 1 to 3 bits, and the first source 21 and the second source 24 use the UDS protocol.

Figure 4:
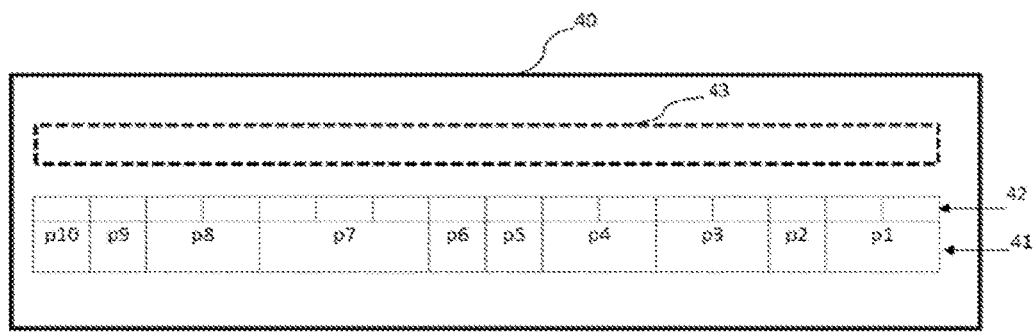
FIG. 4 is a schematic showing an example of the structure of a set of configuration parameters and of the configuration shield, according to certain embodiments of the invention.

FIG. 4 is a schematic showing an example of the structure of the set of parameters p1 to p10 and of the configuration shield 43. The configuration shield 43 contains the configuration identifiers to which the parameters p1 to p10 belong, the positions of the parameters in their configuration identifiers (designated configuration DIDs), and their size in number of bits 42 (here from 1 to 3 bits). The configuration shield 43 is programmable through the first update interface accessible by the technical coordinator via the first source 21 and through the second updating interface accessible by the motor-vehicle constructor manufacturer via the second source 24. In FIG. 4, the parameter shields are empty and the values associated with the parameters are associated with initial values (predefined or default values).

Figure 5:
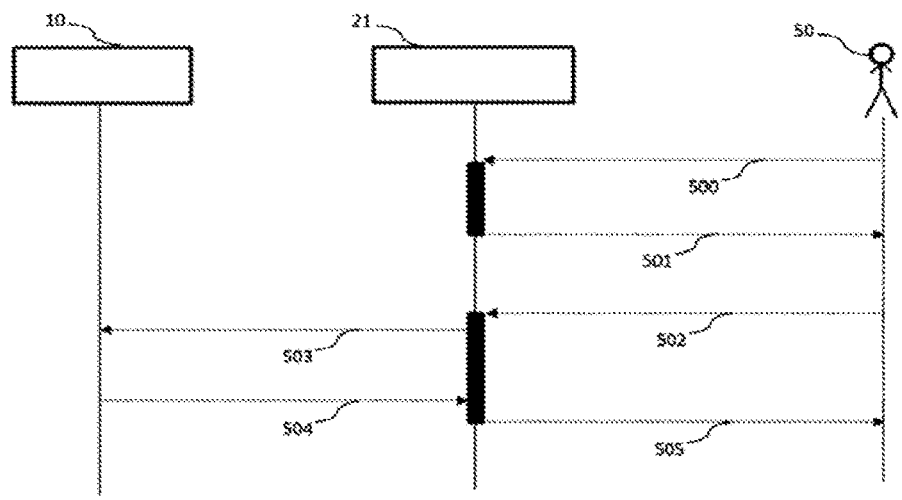
FIG. 5 shows an example of a sequence diagram illustrating the initialization of a set of configuration parameters, according to certain embodiments of the invention.

FIG. 5 shows one example of a sequence diagram illustrating the initialization of the set of configuration parameters p1 to p10 by the motor-vehicle manufacturer 50, according to certain embodiments of the invention in which the initialization of the parameter values associated with the set of parameters p1 to p10 uses the service 'write data by identifier'.

In step 500, the motor-vehicle manufacturer 50 may make a request to the first source 21 to load the configuration by indicating the configuration identifier 'DID=0x2003' and the initial data, i.e. the factory data.

In step 501, the first source 21 may be configured to confirm the configuration has been loaded following the request 500.

In step 502, the motor-vehicle manufacturer may make a request to the first source to send the configuration loaded in step 500 to the electronic control unit 10 so as to initialize the configuration parameters, by indicating the configuration identifier 'DID=0x2003'.

In step 503, a command 'write data by identifier DID=0x2003 Data=Factory data' may be received by the electronic control unit 10 through the first update interface 202 of the first source 21 accessible by the motor-vehicle manufacturer in the initializing step in the factory. Steps 504 and 505 may be performed to indicate that the operation of initializing the set of configuration parameters has finished.

Figure 6:
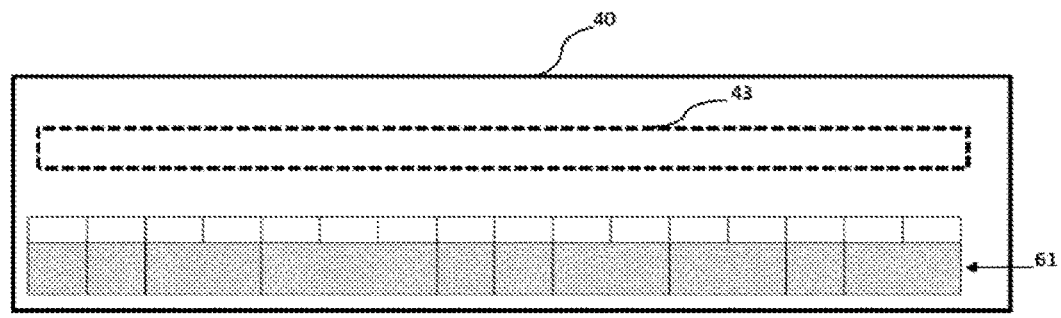
FIG. 6 is a schematic showing an example of the structure of a set of configuration parameters and of the configuration shield after an initializing step, according to certain embodiments of the invention.

FIG. 6 is a schematic showing the structure of the set of configuration parameters p1 to p10 and of the configuration shield after the initializing step corresponding to FIG. 5. As illustrated in FIG. 6, the parameter values associated with the set of parameters have been modified and correspond to the initial factory values 61. The state of the configuration shield has not been modified: all the parameters p1 to p10 are considered to be automatic and the shields associated therewith are empty (or still associated with initial values).

Figure 7:
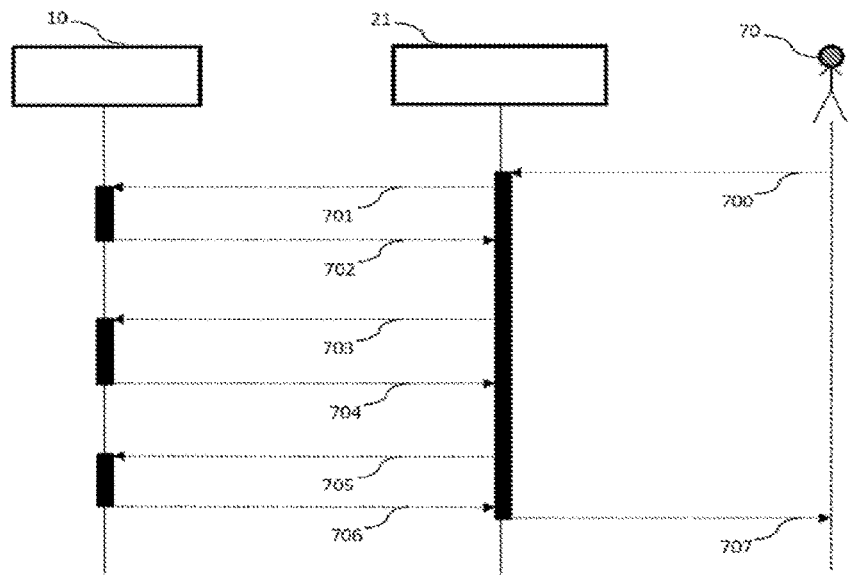
FIG. 7 shows an example of a sequence diagram illustrating the update of the configuration of an electronic control unit at the behest of the technical coordinator, according to certain embodiments.

FIG. 7 shows one example of a sequence diagram illustrating the update of the configuration of the electronic control unit 10 by a technical coordinator 70 through the first source 21 and first update interface (not illustrated in FIG. 7), according to certain embodiments relative to the installation of a new option that requires parameters p3, p6 and p8 to be updated.

In step 700, the technical coordinator 70 may make a request to the first source 21 to install a new option.

In step 701, the first source 21 may be configured to transmit an open-session command to the electronic control unit 10, which may be configured to confirm receipt of the command in step 702.

In step 703, the electronic control unit 10 may be configured to receive a command 'read data by identifier' with the identifier 'DID=0x2003' from the first source 21 and to confirm the read data by identifier has been performed in step 704.

In step 705, the first source 21 may be configured to update the parameters p3, p6 and p8 by sending a command 'write data by identifier' to the electronic control unit 10 via the first update interface 202. Steps 706 and 707 may be carried out to indicate, to the first source and to the technical coordinator, that the write-data command has been executed and that the parameters have been updated for the installation of the new option.

Figure 8:
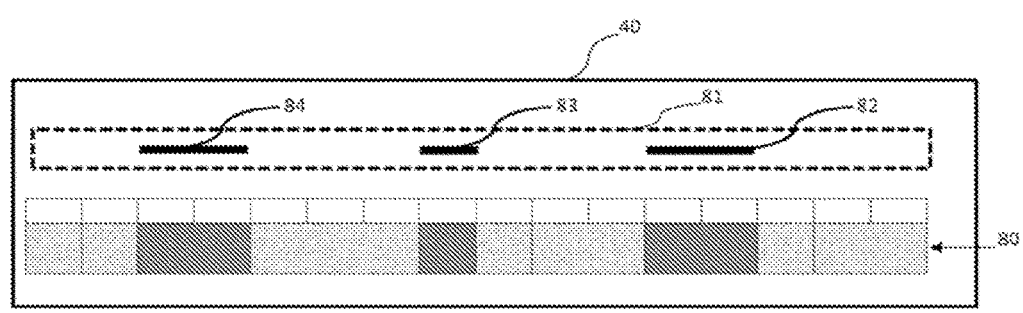
FIG. 8 is a schematic showing an example of the structure of a set of configuration parameters and of the configuration shield after an update performed at the behest of the technical coordinator, according to certain embodiments.

FIG. 8 is a schematic showing the structure of the set of configuration parameters p1 to p10 and the configuration shield 81 after the updating step for installation of a new option corresponding to FIG. 7. As illustrated in FIG. 8, the parameter values associated with the parameters p3, p6, and p8 have been modified and correspond to values 80 updated by the technical coordinator. The state of the shields associated with these parameters has been modified in response to the update of the parameter values associated with these parameters by the technical coordinator. The parameters p3, p6, and p8 become manual parameters protected by the parameter shield 82, 83, and 84, respectively. The state of the parameter shield associated with each of the other parameters p1, p2, p4, p5, p7, p9, and p10 has not changed, these parameters have remained automatic parameters.

Figure 9:
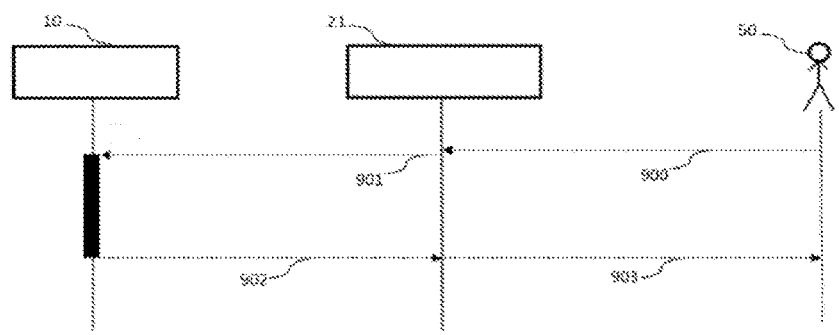
FIG. 9 shows an example of a sequence diagram illustrating the update of the configuration of an electronic control unit at the behest of the motor-vehicle manufacturer following an update effected at the behest of the technical coordinator, according to certain embodiments.

FIG. 9 shows one example of a sequence diagram illustrating the update of the configuration of the electronic control unit 10 by the motor-vehicle manufacturer 50 through the second source 24 and the second update interface (not illustrated in FIG. 9), the update of the electronic control unit 10 consisting in updating the set of the configuration parameters p1 to p10.

In steps 900 and 901, the motor-vehicle manufacturer 50 may make, to the electronic control unit 10, via the second source 24, a request to update the configuration by indicating the configuration identifier 'DID=0x2003' and data equal to update data. This request may be received via the second update interface (not illustrated in FIG. 9). Execution of the update may be confirmed by the ECU 10 to the second source 24 and to the motor-vehicle manufacturer, in steps 902 and 903, respectively.

Figure 10:
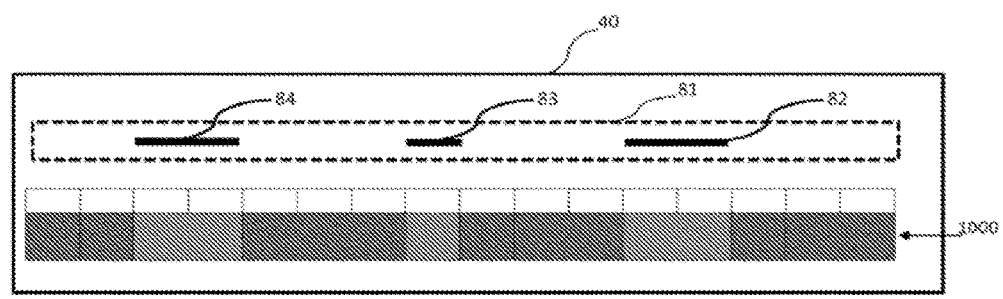
FIG. 10 is a schematic showing an example of the structure of a set of configuration parameters and of the configuration shield after an update performed at the behest of the motor-vehicle manufacturer following an update effected at the behest of the technical coordinator.

FIG. 10 is a schematic showing the structure of the set of configuration parameters p1 to p10 and the configuration shield after the step of updating the configuration at the behest of the motor-vehicle manufacturer corresponding to the sequence diagram shown in FIG. 9. As illustrated in FIG. 10, the parameter values associated with the parameters p3, p6, and p8 have not been modified and correspond to the values 80 updated beforehand by the technical coordinator. Only the automatic parameters p1, p2, p4, p5, p7, p9, and p10 have been updated to the update values 1000 in response to the command transmitted by the motor-vehicle manufacturer.

The invention is not limited to the embodiments described above by way of nonlimiting example. It encompasses any variant of embodiment envisionable by a person skilled in the art.

In general, the routines executed to implement the embodiments of the invention, whether said routines are implemented in the context of an operating system or of a specific application, of a component, of a program, of an object, of a module or of an instruction sequence, or even of a sub-set thereof, may be designated "computer program code" or simply "program code". The program code typically comprises computer-readable instructions that reside, at various times, in various memory and storage devices in a computer and that, when they are read and executed by one or more processors in a computer, lead the computer to perform the operations required to execute the operations and/or elements specific to the various aspects of the embodiments of the invention. The computer-readable instructions of a program for carrying out the operations of the embodiments of the invention may, for example, be assembly language, or even a source code or an object code written in combination with one or more programming languages.

The invention claimed is:

1. A device for controlling an electronic control unit of a motor vehicle, comprising:
   an updating module for updating a configuration of said electronic control unit, said configuration being defined by a set of configuration parameters, at least one configuration parameter being associated with a parameter value and with a filter value, wherein the updating module comprises:
   a first programmable update interface, the first update interface being configured to update the parameter value associated with at least one configuration parameter in response to an update command received from a first source and
   to update the filter value associated with said at least one configuration parameter in response to the update of said value, the filter value indicating for each of the at least one configuration parameter whether the at least one configuration parameter is a manual parameter or an automatic parameter; and
   a second programmable update interface, the second update interface being configured to update the parameter values associated with at least some of the set of configuration parameters depending on whether the filter values associated with said configuration parameters are manual parameters or automatic parameters, in response to an update command received from a second source,
   wherein said first update interface is configured to modify the filter value associated with one or more configuration parameters to convert one or more automatic or manual parameters into one or more manual or automatic parameters,
   an automatic parameter being a configuration parameter associated with a parameter value updated in response to an update command received from said second source,
   a manual parameter being a configuration parameter associated with a parameter value updated in response to an update command received from said first source.

2. The device as claimed in claim 1, wherein the parameter values associated with said set of configuration parameters are initialized at initial factory values and/or result from a preceding update.

3. The device as claimed in claim 1, wherein said second update interface is configured to update, in response to an update command received from said second source, the set of configuration parameters defining said configuration.

4. The device as claimed in claim 1, wherein said first update interface is configured to read the filter value associated with one or more configuration parameters.

5. The device as claimed in claim 1, wherein said second update interface is configured to remove the filter value associated with a given configuration parameter.

6. The device as claimed in claim 1, wherein said first source is a diagnostic tool accessible by a motor-vehicle manufacturer with a view to initializing the parameter values associated with the set of configuration parameters, said diagnostic tool being accessible by a technical coordinator with a view to updating the value associated with at least one configuration parameter and to updating the filter value associated with said at least one configuration parameter in response to said update through said first update interface.

7. The device as claimed in claim 1, wherein said second source is a remote updating server accessible by the motor-vehicle manufacturer with a view to updating at least some of the set of configuration parameters.

8. A method for controlling an electronic control unit of a motor vehicle, comprising:
   updating a configuration of said electronic control unit, said configuration being defined by a set of configuration parameters, at least one configuration parameter being associated with a parameter value and with a filter value;

initializing the parameter values associated with said set of configuration parameters to initial factory values;

updating, through a first programmable update interface, the parameter value associated with at least one configuration parameter in response to an update command received from a first source;

updating, through said first programmable update interface, the filter value associated with said at least one configuration parameter in response to the update of said parameter value associated with at least one configuration parameter, the filter value indicating for each of the at least one configuration parameter whether the at least one configuration parameter is a manual parameter or an automatic parameter; and updating the parameter values associated with at least some of the set of configuration parameters depending on whether the filter values associated with said configuration parameters are manual parameters or automatic parameters, in response to an update command received from a second source, wherein said updating via the first update interface further includes modifying the filter value associated with one or more configuration parameters to convert one or more automatic or manual parameters into one or more manual or automatic parameters, an automatic parameter being a configuration parameter associated with a parameter value updated in response to an update command received from said second source, a manual parameter being a configuration parameter associated with a parameter value updated in response to an update command received from said first source.

9. A device for controlling an electronic control unit of a motor vehicle, comprising:

an updating module for updating a configuration of said electronic control unit, said configuration being defined by a set of configuration parameters, at least one configuration parameter being associated with a parameter value and with a filter value, wherein the updating module comprises:

a first programmable update interface, the first update interface being configured to update the parameter value associated with at least one configuration parameter in response to an update command received from a first source and to update the filter value associated with said at least one configuration parameter in response to the update of said value, the filter value indicating for each of the at least one configuration parameter whether the at least one configuration parameter is a manual parameter or an automatic parameter; and a second programmable update interface, the second update interface being configured to update the parameter values associated with at least some of the set of configuration parameters depending on whether the filter values associated with said configuration parameters are manual parameters or automatic parameters, in response to an update command received from a second source, wherein said first source is a diagnostic tool accessible by a motor-vehicle manufacturer with a view to initializing the parameter values associated with the set of configuration parameters, said diagnostic tool being accessible by a technical coordinator with a view to updating the value associated with at least one configuration parameter and to updating the filter value associated with said at least one configuration parameter in response to said update through said first update interface.

\* \* \* \* \*